April 2, 1940. O. L. KONOW Re. 21,414

HARVESTER REEL

Original Filed April 3, 1937 2 Sheets-Sheet 1

Inventor
O. L. Konow
by
Attorney

April 2, 1940. O. L. KONOW Re. 21,414

HARVESTER REEL

Original Filed April 3, 1937 2 Sheets-Sheet 2

Inventor
O. L. Konow
by
Attorney

Reissued Apr. 2, 1940

Re. 21,414

UNITED STATES PATENT OFFICE 21,414

HARVESTER REEL

Otto L. Konow, Lockport, Ill., assignor, by direct and mesne assignments, to Allis-Chalmers Manufacturing Company, a corporation of Delaware Original No. 2,095,364, dated October 12, 1937, Serial No. 134,873, April 3, 1937. Application for reissue September 26, 1939, Serial No. 296,622

7 Claims. (Cl. 56—221)

The present invention relates to new and useful improvements in reels for agricultural machines such as harvesters and combines and has for its primary object to provide, in a manner as hereinafter set forth, means whereby the reel may be conveniently raised or lowered to any desired position from the operator's seat of the tractor or other power unit to meet various conditions that are frequently encountered, such as tall and short grain.

Another very important object of the invention is to provide novel means for maintaining the proper tension on the drive belt regardless of the position of the reel.

Other objects of the invention are to provide a reel of the aforementioned character for agricultural machines which will be comparatively simple in construction, strong, durable, highly efficient and reliable in use, compact and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein.

Figure 1:
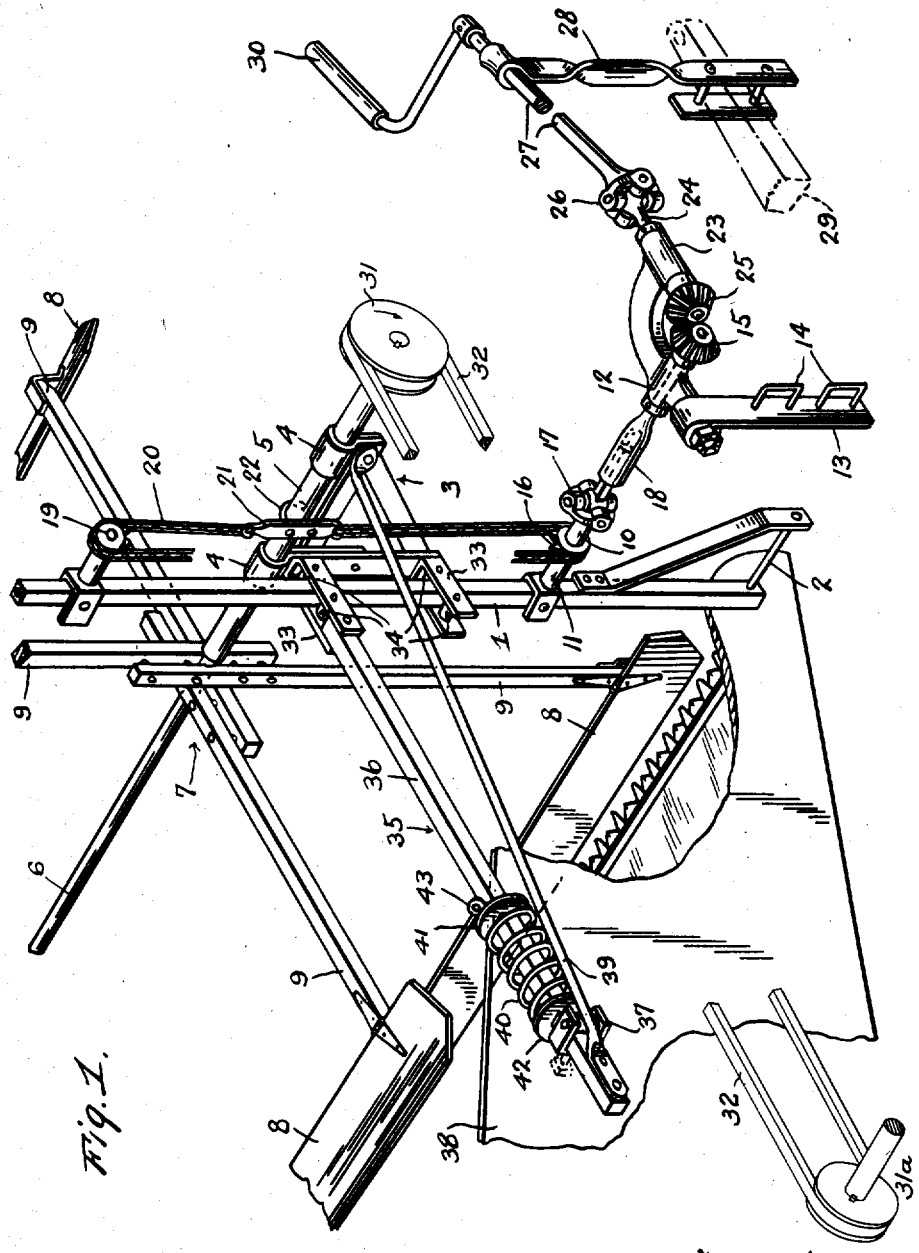
Figure 1 is a perspective view of an embodiment of the invention.
Figure 2:
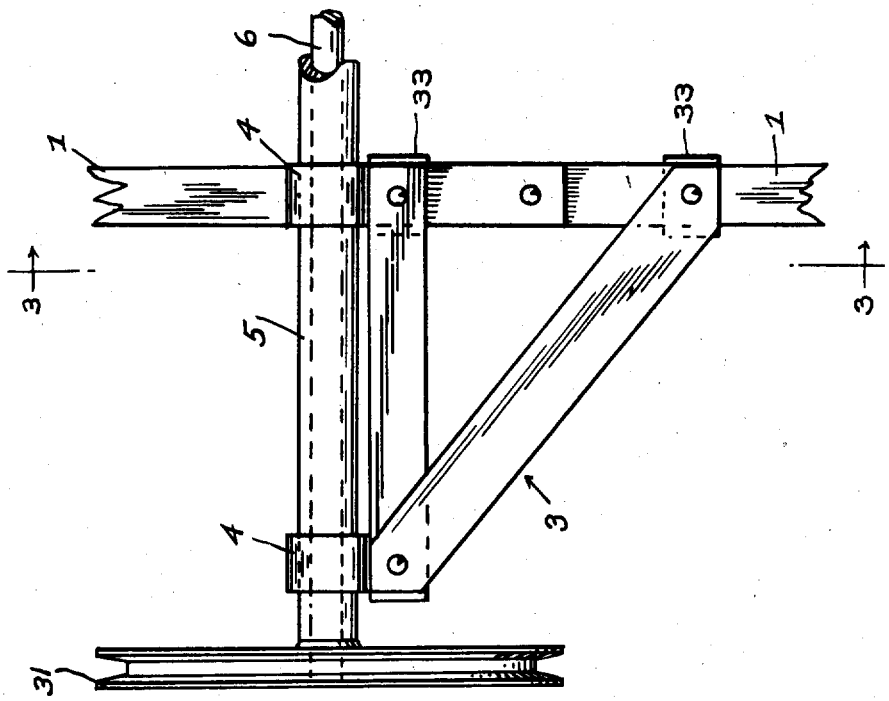
Figure 2 is a view in front elevation of the reel shaft bracket.

Referring now to the drawings in detail, it will be seen that the embodiment of the invention which has been illustrated comprises an upwardly extending reel post 1 of substantially square cross section which is provided with suitable means at its lower end, as at 2, for mounting said post on a portion of the frame, near the forward end thereof, of the reaper or other machine for swinging movement in a vertical plane. Mounted for vertical sliding adjustment on the post 1 is a bracket which is designated generally by the reference numeral 3, said bracket including transversely aligned clamps 4 which secure the tubular bearing 5 in position on the bracket 3. The shaft 6 of the reel is journaled in the bearing 5, said reel being designated generally by the reference numeral 7 and including the usual blades or paddles 8 mounted on the arms 9. As is customary, the reel is positioned over a cutting sickle at the forward end of the frame of the harvester, and, during operation, the blades of the reel bend the grain stalks toward the sickle which cuts the stalks, the reel blades assisting in carrying the severed stalks rearwardly onto a grain receiving portion or grain trough of the harvester.

The reference numeral 10 designates an extensible shaft at one end rotatably supported on the post 1 below the bracket 3, as at 11. The other end portion of the shaft 10 is journaled in a suitable bearing 12 which is loosely mounted on a support 13, said support being secured in any suitable manner to the reaper, as by U-bolts or clamps 14. Fixed on the outer end of the shaft 10 is a bevelled gear 15. Fixed on the shaft 10 adjacent the post 1 is a sprocket 16. Interposed in the shaft 10 is a suitable universal joint 17. Between the universal joint 17 and the bearing 12, the shaft 10 is provided with a sliding connection 18. The connection 18 includes a polygonal socket slidably receiving a square portion of the shaft 10. Rotatably mounted on the upper portion of the post 1 is a sprocket 19. The reference numeral 20 designates an endless chain which is trained around the sprockets 16 and 19. Interposed in the chain 20 is a plate 21 to which the bearing 5 is secured by a U-bolt or clamp 22.

Mounted on the bearing 12 at right angles thereto is a bearing 23 in which a shaft 24 is journaled. On one end of the shaft 24 is fixed a beveled gear 25 which drives the gear 15. The other end of the shaft 24 is connected by a suitable universal joint 26 to a shaft 27. The shaft 27 may be of any suitable length and in any desired number of sections and the forward end portion of said shaft is journaled on a support 28 which is mounted, for example, on the draw bar 29 of the reaper. Fixed on the forward end portion of the shaft 27 is a crank 30 which is adapted to be operated from the seat of the tractor or other power unit.

Figure 3:
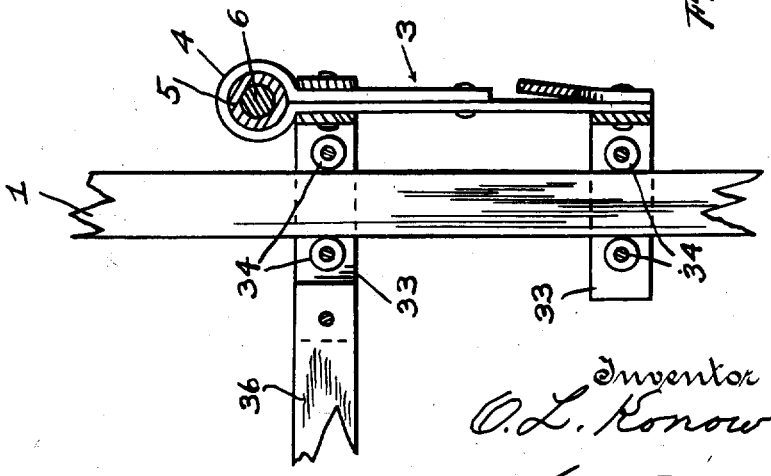
Figure 3 is a vertical sectional view, taken substantially on the line 3—3 of Fig. 2.

Fixed on the shaft 6 of the reel 7 is the usual pulley 31 over which a drive belt 32 is trained, this belt being driven by a driving pulley fixed on a shaft, as indicated at 31a, operatively mounted on a rearwardly located portion of the frame. The bracket 3 further includes a pair of substantially U-shaped members 33 which straddle the post 1. As illustrated to advantage in Fig. 3 of the drawings, rollers 34 are journaled in the members 33 and travel on opposite sides of the post 1.

The reference numeral 35 designates generally an automatic tightener for the belt 32. The belt tightener 35 includes a rod or bar 36 of polygonal cross-section having its forward end pivotally connected to the uppermost member 33, and extending rearwardly therefrom in a direction transverse to the direction of the length of the upwardly extending post 1. The rear end portion of the rod 36 extends slidably through a substantially U-shaped guide 37 which is loosely mounted on the side wall of the grain trough 38 of the reaper. A brace 39 extends from the outer portion of the bracket 3 to the rear end portion of the rod 36. Encircling the rod 36 and adapted to yieldingly urge same forwardly is a coil spring 40. The coil spring 40 is confined under tension between washers 41 and 42 which are slidably mounted on the rod 36. The washer 41 bears against a pin 43 in the rod 36 and the washer 42 bears against the guide 37.

The spring 40 is normally in compression and urges the abutment washer 42 against the guide 37 and urges the abutment washer 41 against the pin 43 in the rod 36, the spring thus urging forwardly the rod 36 and the bracket 3 carrying the reel shaft 6, thereby placing the required tension on the driving belt 32. And the rod 36, being pivotally connected to the bracket 3 and yieldingly connected to the frame through the spring 40 and the guide 37, thus serves as a resiliently yieldable brace for retaining the post 1 extending upwardly in desired position. Through the connection of the rear end of the brace 39 to the rod 36 at a point rearwardly of the guide 37, this portion of the brace 39 serves as a projection on the rod 36 to cooperate with the guide 37 and thus limit the forward movement of rod 36 and the bracket 3 and post 1, even though the driving belt 32 should be removed from the pulley 31.

It is thought that the operation of the invention will be readily apparent from a consideration of the foregoing. To elevate the reel 7 the crank 30 is turned in one direction for actuating the chain 20, thus raising said reel. Of course, to lower the reel 7 the crank 30 is turned in the opposite direction. The coil spring 40 of the tightener 35 yieldingly pushes forwardly on the swinging post 1 at all times for maintaining the proper tension on the reel drive belt 32.

It is believed that the many advantages of a harvester reel constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. In a harvesting machine including its frame and reel shaft, a post pivotally connected to a part of the frame at its lower end, a bracket, a tubular bearing carried by the bracket and through which the shaft passes, upper and lower roller carrying members attached to the bracket and through which the post passes with the rollers engaging the post, a movable member carried by the post and connected with the bracket for imparting vertical movement to the bracket, means including shafting, having universal joints and slip joints therein, and gearing for imparting movement to the movable member, means for supporting said shafting from the frame, drive means for the reel shaft including a pulley thereon and a driving belt therefor, a bar pivotally connected to one of the roller carrying members, means for slidably supporting the bar from the frame, spring means associated with said bar for forcing the bar in a certain direction and maintaining said driving belt taut.

2. In a harvesting machine including its frame and a reel shaft, a post pivotally connected to the frame at its lower end, a bracket, a tubular bearing carried by the bracket and through which said shaft passes, upper and lower roller carrying members attached to said bracket and through which said post passes with the rollers engaging said post, a flexible movable member carried by said post and connected with said bracket for imparting vertical movement to said bracket, means for imparting movement to said movable member to thereby cause raising and lowering of said bracket and bearing carried thereby, drive means for the reel shaft including a pulley thereon and a driving belt therefor, a bar pivotally connected to one of the roller carrying members and extending rearwardly therefrom in a direction transverse to the direction of the length of said post, means for slidably supporting the bar from the frame, and spring means associated with said supporting means and said bar for forcing said bar and said bracket and shaft associated therewith in a certain direction and operative to maintain said driving belt taut.

3. In a harvesting machine including a frame having a grain-receiving trough, a harvesting reel having a shaft, a post pivotally mounted on a part of the frame and extending upwardly from said pivotal mounting, a bearing bracket movably mounted on said post and capable of being moved up and down along said post, a tubular bearing carried by said bracket and in which said shaft is rotatably mounted, a movable member carried by said post and connected to said bracket, means for imparting movement to said bracket through said movable member to cause said bracket to slide along said post to different vertical positions thereon, drive means for said reel shaft including a pulley on the shaft and a driving belt therefor extending rearwardly to a driving pulley on the frame, a brace bar pivotally connected to a portion of said bracket and extending rearwardly therefrom in a direction transverse to the direction of the length of said post, means for slidably supporting said bar from the frame, and spring means associated with said bar for forcing the latter and said bracket and shaft in a forward direction, and said spring means being operative through its association with said bar and said frame to maintain said driving belt in taut driving relation to the pulley on the reel shaft.

4. In a harvesting machine including a frame having a grain trough portion to receive harvested grain, a harvesting reel including a shaft, a post having its lower end pivotally mounted on a forward portion of said frame, a bracket slidably mounted on said post for up and down movement thereon, a tubular bearing carried by said bracket and in which said reel shaft is rotatably mounted, a member rotatable on a substantially horizontal axis and carried by said post above said bracket, means for sliding said bracket along said post, said means including a flexible operating element connected to said bracket and passing over said rotatable member and operable to lift said bracket, a bar pivotally connected at one end to a portion of said bracket and extending rearwardly in a direction transverse to the direction of the length of said post, means for slidably supporting said bar on said grain trough, drive means for said shaft including a pulley thereon and a driving belt therefor spring means associated with said bar and said supporting means for yieldingly forcing said bracket and said shaft carried thereby in a forward direction to maintain tautness of said driving belt.

5. In a harvesting machine including a frame, a harvesting reel having a shaft, a post pivotally mounted adjacent its lower end on a forward portion of said frame, a bearing bracket movably mounted on said post for up and down movement thereon, a tubular bearing carried by said bracket and in which said shaft is rotatably mounted, a movable member carried by said post and connected to said bracket, means for imparting movement to said bracket through said movable member to cause said bracket to slide along said post to different positions thereon, a bar pivotally connected to a portion of said bracket and extending rearwardly and transversely of said post, means for slidably supporting a rear end portion of said bar from said frame, spring means associated with said bar for forcing said bracket and shaft carried thereby in a forward direction, and drive means for the shaft including a pulley thereon and a driving belt therefor extending rearwardly therefrom and held taut through the action of said spring means urging said bar in said direction.

6. In a harvesting machine including a frame, a harvesting reel having a shaft, an upwardly extending post mounted on said frame, a bracket, a tubular bearing carried by said bracket and in which said shaft is rotatably supported, said bracket being mounted for sliding movement to different positions along said post, means for imparting sliding movement to said bracket with respect to said post, a bar connected to said bracket and extending rearwardly in a direction transverse to the length of said post, drive means for said shaft including a pulley on said shaft and a driving belt therefor, and means for yieldingly and resiliently supporting the rear end portion of said bar from said frame and operative to yieldingly hold said driving belt in taut driving relation.

7. In a harvesting machine including a frame, a harvesting reel including a shaft, a post having its lower end pivotally mounted on said frame, a bracket slidably mounted for movement along said post and carrying a bearing in which said shaft is rotatably mounted, means including a flexible operating element operatively connected to said bracket for sliding said bracket relative to said post, drive means for said shaft including a pulley thereon and a driving belt therefor, and a bracing connection between said post and said frame and extending rearwardly from said post and in a direction transverse to the length of said post, said bracing connection including a resiliently yieldable connection to said frame and being operative to yieldingly urge said post and said shaft in a direction to maintain tautness of said driving belt.

OTTO L. KONOW.